(12) United States Patent
Koizumi et al.

(10) Patent No.: US 11,227,615 B2
(45) Date of Patent: Jan. 18, 2022

(54) SOUND PROCESSING APPARATUS AND SOUND PROCESSING METHOD

(71) Applicant: SONY CORPORATION, Tokyo (JP)

(72) Inventors: Tatsuya Koizumi, Tokyo (JP); Taiji Yoshida, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/642,102

(22) PCT Filed: Jul. 25, 2018

(86) PCT No.: PCT/JP2018/027914
§ 371 (c)(1),
(2) Date: Feb. 26, 2020

(87) PCT Pub. No.: WO2019/049543
PCT Pub. Date: Mar. 14, 2019

(65) Prior Publication Data
US 2020/0227057 A1    Jul. 16, 2020

(30) Foreign Application Priority Data

Sep. 8, 2017 (JP) .............................. JP2017-172686

(51) Int. Cl.
*G10L 19/032* (2013.01)
(52) U.S. Cl.
CPC .................. *G10L 19/032* (2013.01)
(58) Field of Classification Search
CPC ...... G06F 3/0236; G06F 3/048; G06F 3/0484; G06F 3/16; G06F 3/162; G06F 3/165; G06F 3/167; G10L 19/032; G10L 19/035; G10L 19/038; G10L 19/22; G10L 19/24; G11B 20/10037; G11B 2020/10555;
(Continued)

(56) References Cited

U.S. PATENT DOCUMENTS 6,487,535 B1* 11/2002 Smyth ................. G10L 19/0208
704/500
6,707,460 B1* 3/2004 Swanson ................. H03M 7/04
345/605
(Continued)

FOREIGN PATENT DOCUMENTS

EP    1178485 A2    2/2002
JP    61-100026 A    5/1986
(Continued)

OTHER PUBLICATIONS

International Search Report and Written Opinion of PCT Application No. PCT/JP2018/027914, dated Sep. 11, 2018, 06 pages of ISRWO.

*Primary Examiner* — Andrew C Flanders
(74) *Attorney, Agent, or Firm* — Chip Law Group

(57) ABSTRACT

A sound processing apparatus includes: a conversion unit that samples predetermined audio data with a first quantization bit rate and a second quantization bit rate greater than the first quantization bit rate and outputs the respective results as first digital audio data and second digital audio data; a frequency analysis unit that performs frequency analysis on each output from the conversion unit; and a determination unit that performs predetermined determination processing on the basis of analysis results by the frequency analysis unit.

13 Claims, 6 Drawing Sheets

(58) Field of Classification Search
CPC ........... G11B 2020/10564; G11B 2020/10583; H03M 1/001; H03M 1/005; H03M 1/007; H03M 1/008; H03M 1/0854; H03M 1/126; H03M 1/1265; H03M 1/127; H03M 1/129; H03M 1/14; H03M 1/20; H03M 1/204; H03M 1/208; H03M 1/36; H03M 1/361; H03M 1/661; H03M 3/392; H03M 3/412; H03M 3/42; H03M 3/428; H03M 3/43; H03M 3/482; H03M 3/496; H03M 3/498; H03M 7/302; H03M 7/3026; H03M 9/00
See application file for complete search history.

(56) References Cited

U.S. PATENT DOCUMENTS

| | | | | |
|---|---|---|---|---|
| 6,757,437 | B1* | 6/2004 | Keith | G06F 17/148 375/E7.016 |
| 7,876,252 | B1 | 1/2011 | Wegener | H03M 7/30 341/155 |
| 2002/0032571 | A1* | 3/2002 | Leung | G10L 21/0364 704/503 |
| 2004/0160348 | A1* | 8/2004 | Hochschild | H03M 7/3015 341/143 |
| 2006/0053020 | A1* | 3/2006 | Chen | G10L 19/24 704/503 |
| 2006/0074693 | A1* | 4/2006 | Yamashita | G10L 19/035 704/500 |
| 2008/0097763 | A1* | 4/2008 | Van De Par | G10L 19/22 704/500 |
| 2009/0274210 | A1* | 11/2009 | Grill | G10L 19/032 375/240.03 |
| 2009/0276721 | A1* | 11/2009 | Brockbank | G06F 11/2247 715/764 |
| 2010/0228556 | A1* | 9/2010 | Bahn | G10L 19/032 704/500 |
| 2010/0324912 | A1* | 12/2010 | Choo | H03M 7/4018 704/500 |
| 2011/0035226 | A1* | 2/2011 | Mehrotra | G10L 21/038 704/500 |
| 2011/0224991 | A1* | 9/2011 | Fejzo | G10L 19/0017 704/500 |
| 2011/0238425 | A1* | 9/2011 | Neuendorf | G10L 19/18 704/500 |
| 2013/0236032 | A1* | 9/2013 | Wakeland | G10L 19/24 381/104 |
| 2015/0025895 | A1* | 1/2015 | Schildbach | G10L 19/16 704/500 |
| 2015/0179182 | A1* | 6/2015 | Vinton | G10L 19/032 704/226 |
| 2016/0292268 | A1* | 10/2016 | Randall | G11B 27/11 |
| 2016/0295324 | A1* | 10/2016 | Randall | G11B 27/031 |
| 2018/0007487 | A1* | 1/2018 | Kitazawa | H04R 3/005 |
| 2018/0151187 | A1* | 5/2018 | Sorensen | H04M 3/568 |
| 2018/0192066 | A1* | 7/2018 | Haimi-Cohen | H04N 19/154 |
| 2019/0027157 | A1* | 1/2019 | Tsingos | G10L 19/032 |
| 2019/0174146 | A1* | 6/2019 | Kataoka | H04N 19/44 |

FOREIGN PATENT DOCUMENTS

| | | |
|---|---|---|
| JP | 2001-285803 A | 10/2001 |
| JP | 2002-050124 A | 2/2002 |

* cited by examiner

SOUND PROCESSING APPARATUS AND SOUND PROCESSING METHOD

CROSS REFERENCE TO RELATED APPLICATIONS

This application is a U.S. National Phase of International Patent Application No. PCT/JP2018/027914 filed on Jul. 25, 2018, which claims priority benefit of Japanese Patent Application No. JP 2017-172686 filed in the Japan Patent Office on Sep. 8, 2017. Each of the above-referenced applications is hereby incorporated herein by reference in its entirety.

TECHNICAL FIELD

The present disclosure relates to a sound processing apparatus, a sound processing method, and a program.

BACKGROUND ART

As technology advances, audio data obtained by sampling (quantizing) with a higher quantization bit rate is beginning to be recorded (e.g., see Patent Document 1).

CITATION LIST

Patent Document

Patent Document 1: Japanese Patent Application Laid-Open No. 2006-303633

SUMMARY OF THE INVENTION

Problems to be Solved by the Invention

In such a field, it is desirable to perform sampling with an appropriate quantization bit rate depending on the ambient environment and the like.

Therefore, it is an object of the present disclosure to provide a sound processing apparatus, a sound processing method, and a program, which can perform sampling with an appropriate quantization bit rate depending on the ambient environment and the like.

Solutions to Problems

The present disclosure is, for example, a sound processing apparatus including:

a conversion unit configured to sample predetermined audio data with a first quantization bit rate and a second quantization bit rate greater than the first quantization bit rate and output respective results as first digital audio data and second digital audio data;

a frequency analysis unit configured to perform frequency analysis on each output from the conversion unit; and a determination unit configured to perform predetermined determination processing on the basis of analysis results by the frequency analysis unit.

Moreover, the present disclosure is, for example, a sound processing method including:

by a conversion unit, sampling predetermined audio data with a first quantization bit rate and a second quantization bit rate greater than the first quantization bit rate and outputting respective results as first digital audio data and second digital audio data;

by a frequency analysis unit, performing frequency analysis on each output from the conversion unit; and by a determination unit, performing predetermined determination processing on the basis of analysis results by the frequency analysis unit.

Furthermore, the present disclosure is, for example, a program causing a computer to execute a sound processing method, the sound processing method including:

by a conversion unit, sampling predetermined audio data with a first quantization bit rate and a second quantization bit rate greater than the first quantization bit rate and outputting respective results as first digital audio data and second digital audio data;

by a frequency analysis unit, performing frequency analysis on each output from the conversion unit; and by a determination unit, performing predetermined determination processing on the basis of analysis results by the frequency analysis unit.

Effects of the Invention

According to at least embodiments of the present disclosure, it is possible to perform sampling with an appropriate quantization bit rate depending on the ambient environment and the like. Note that the effects described herein are not necessarily limited, and any one of the effects described in the present disclosure may be exerted. Furthermore, the contents of the present disclosure are not to be interpreted as being limited by the exemplified effects.

MODE FOR CARRYING OUT THE INVENTION

Hereinafter, embodiments and the like of the present disclosure will be described with reference to the drawings. Note that the description will be given in the following order.

<1. First Embodiment>
<2. Second Embodiment>
<3. Third Embodiment>
<4. Modification Examples>

The embodiments and the like described below are preferred specific examples of the present disclosure, and the contents of the present disclosure are not limited to these embodiments and the like.

1. First Embodiment

Configuration Example of Sound Processing Apparatus

Figure 1:
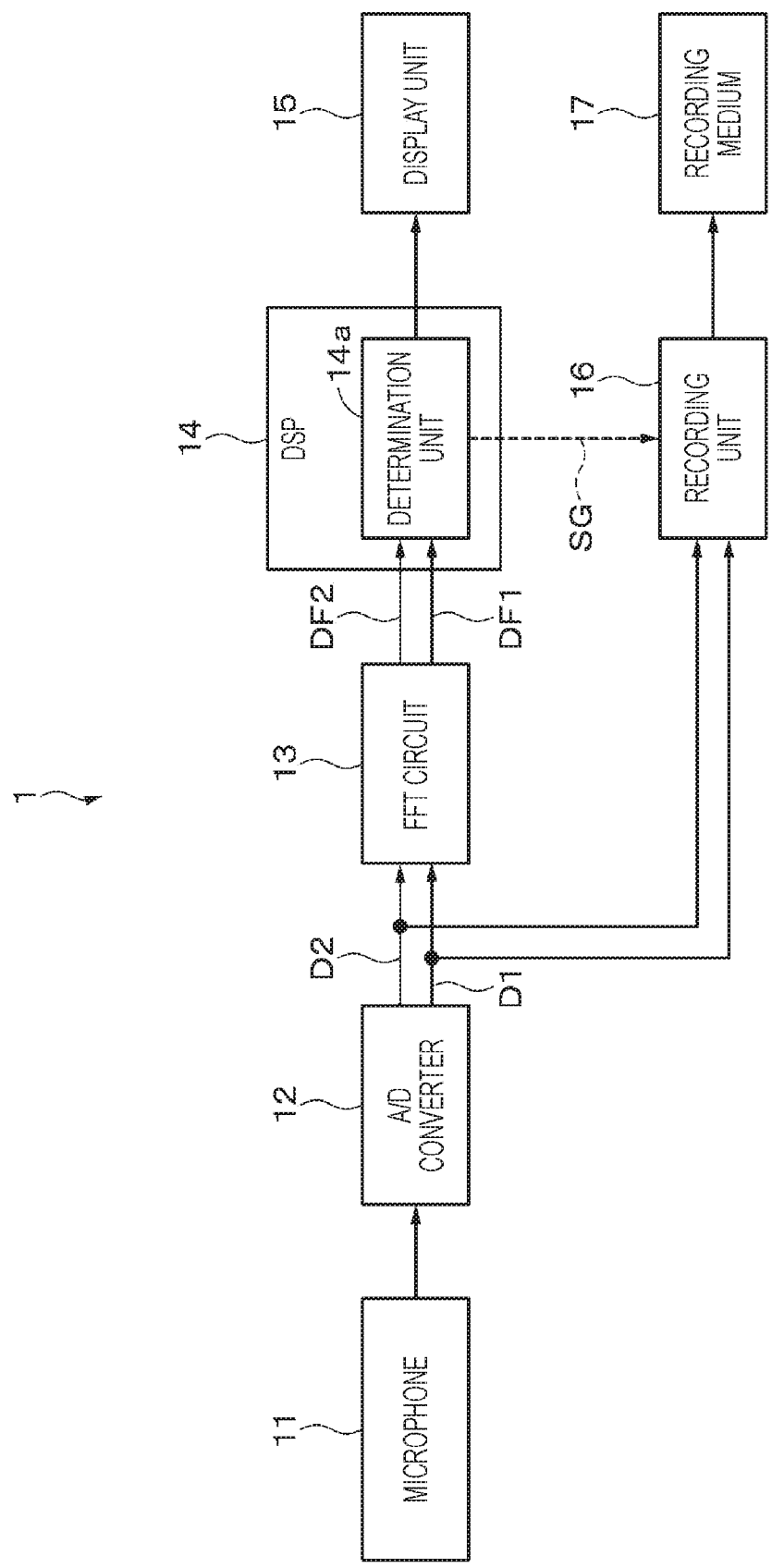
FIG. 1 is a block diagram showing a configuration example of a sound processing apparatus according to a first embodiment.

FIG. 1 is a block diagram showing a configuration example of a sound processing apparatus (sound processing apparatus 1) according to a first embodiment. The sound processing apparatus 1 can be applied to, for example, a device capable of recording sound, specifically, an imaging apparatus, a smartphone, a portable audio recording device, a wearable device, and the like.

The sound processing apparatus 1 has, for example, a microphone 11 that is one example of a sound collection unit, an analog-to-digital (A/D) converter 12 that is one example of a conversion unit, and a fast Fourier transform (FFT) circuit 13 that is one example of a frequency analysis unit, a digital signal processor (DSP) 14, a display unit 15, a recording unit 16, and a recording medium 17.

The microphone 11 collects ambient sound and may be a microphone built in the sound processing apparatus 1 or may be a microphone (external microphone) detachable from the sound processing apparatus 1. The sound may be any sound such as music, human voice, or natural sound. The microphone 11 according to the first embodiment is a microphone having sufficient performance for a quantization bit rate of 24 bits as described later. The microphone 11 outputs, to the A/D converter 12, predetermined analog audio data corresponding to the collected sound.

The A/D converter 12 converts the analog audio data supplied from the microphone 11 into digital audio data. The A/D converter 12 samples the analog audio data with two quantization bit rates (a first quantization bit rate and a second quantization bit rate greater than the first quantization bit rate). Note that the sampling frequency is set to an arbitrary value (e.g., 96 kilohertz (kHz)). The first quantization bit rate is a bit number less than, for example, 16 bits, and the second quantization bit rate is a bit number greater than, for example, 24 bits (e.g., 24 bits or 32 bits). The embodiment will be described supposing that the first quantization bit rate is 16 bits and the second quantization bit rate is 24 bits. Note that audio data obtained with a sampling frequency of 96 kHz and a quantization bit rate of 24 bits may be referred to as high-res (the abbreviation of high resolution) in some cases.

The A/D converter 12 outputs, as digital audio data D1, first digital audio data obtained by AD conversion with a quantization bit rate of 16 bits. The A/D converter 12 also outputs, as digital audio data D2, second digital audio data obtained by AD conversion with a quantization bit rate of 24 bits. The digital audio data D1 and D2 are supplied to the FFT circuit 13. The digital audio data D1 and D2 branch and are also supplied to the recording unit 16.

The FFT circuit 13 performs FFT on the digital audio data D1 and outputs, to the DSP 14, an analysis result DF1 which is the result (frequency domain result). The analysis result DF1 is, for example, data in which the analysis result, an identifier indicating the digital audio data D1, and the quantization bit rate are associated. The FFT circuit 13 also performs FFT on the digital audio data D2 and outputs, to the DSP 14, an analysis result DF2 which is the result (frequency domain result). The analysis result DF2 is, for example, data in which the analysis result, an identifier indicating the digital audio data D2, and the quantization bit rate are associated.

The DSP 14 controls each unit of the sound processing apparatus 1. The DSP 14 has a determination unit 14a as a function. The determination unit 14a according to the first embodiment determines ambient environmental noise such as background noise on the basis of the analysis results DF1 and DF2. More specifically, the determination unit 14a determines environmental noise, and determines, on the basis of the determination result, that the environment is suitable for recording which of digital audio data with the quantization bit rate of 16 bits or 24 bits. Note that the environmental noise means noise conditions (the presence or absence of noise, the level thereof, and the like) around a sound collection place. The DSP 14 outputs a recording control signal SG to the recording unit 16 in response to the determination result of the determination unit 14a.

The display unit 15 includes a driver and a display. Examples of the display can include a liquid crystal display (LCD) and an organic electro luminescence (EL). The display unit 15 displays for 16 bits and 24 bits. As a specific example, information associated with which of the audio data (the digital audio data D1) sampled with 16 bits or the audio data (the digital audio data D2) sampled with 24 bits is recorded.

The recording unit 16 records the digital audio data on the recording medium 17. The recording unit 16 includes, for example, a switcher (not shown), switches the input by switching the switcher, and selectively records any one of the digital audio data D1 or D2 on the recording medium 17. The switcher is switched by the recording control signal SG output by the DSP 14.

The recording medium 17 may be a hard disk or the like built in the sound processing apparatus 1, may be a portable memory such as a universal serial bus (USB) memory, an optical disk, or an SD card, or may be any one that can record at least audio data corresponding to the sound collected by the microphone 11.

Problems to be Considered for Recording Audio Data

Here, problems to be considered for recording audio data will be described. As described above, in the sound processing apparatus according to the present embodiment, in addition to recording digital audio data with a commonly used quantization bit rate of 16 bits, recording digital audio data with a higher quantization bit rate (e.g., 24 bits) is possible. In order to effectively use AD conversion with such a high quantization bit rate, it is necessary to perform recording in a low noise environment. If audio data with a high quantization bit rate is recorded in an environment where the noise is not sufficiently low, the file size becomes greater than necessary, and the recording time of the recording medium is shortened. On the other hand, the recorded sound source has sound quality not so different from that of the audio data of 16 bits. Therefore, it is necessary to perform AD conversion using an appropriate quantization bit rate. In light of the above points, the embodiments of the present disclosure will be further described.

[Processing by Determination Unit]

Figure 2A:
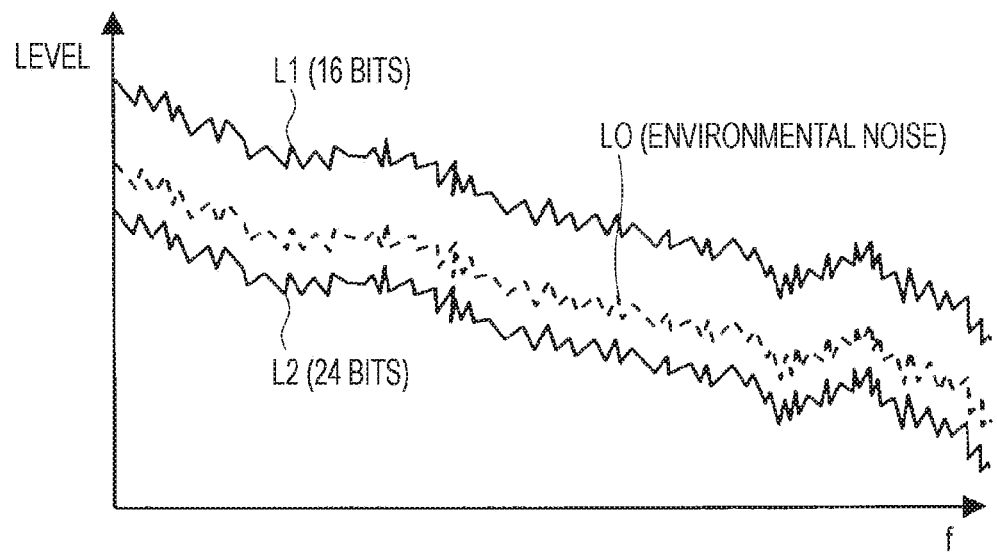
FIGS. 2A and 2B are reference diagrams for explaining determination processing in a determination unit.
Figure 2B:
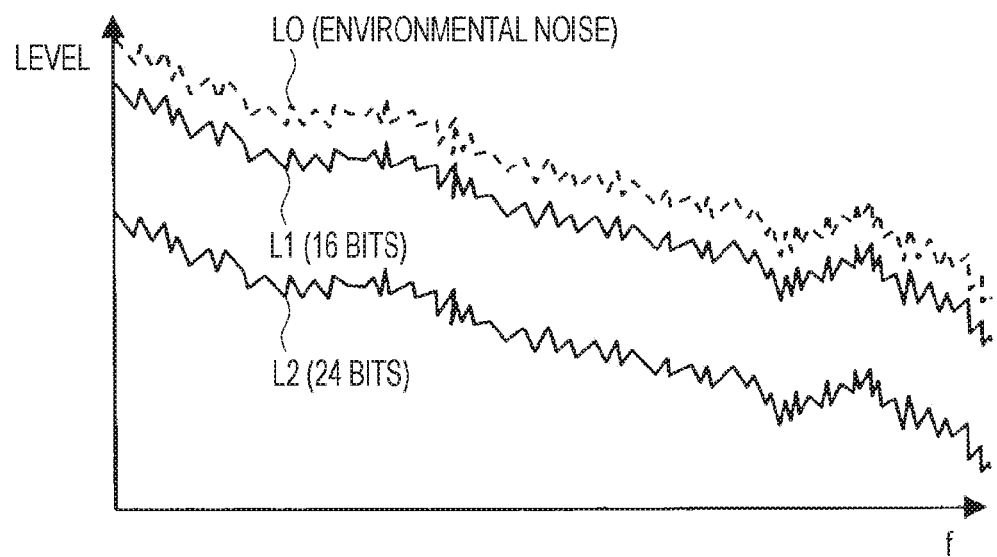

FIGS. 2A and 2B are reference diagrams for explaining determination processing in the determination unit 14a. In general, the higher (greater) the quantization bit rate is, the higher the resolution in the direction of the sound volume is. Thus, the recording capability for an audio signal likely to be buried in noise is excellent. However, as described above, in a case where the environmental noise is great, an effective effect cannot be obtained even if the quantization bit rate is increased.

In each of the graphs in FIGS. 2A and 2B, the horizontal axis indicates a frequency, and the vertical axis indicates a level. For example, the environmental noise (pure noise component), which is collected by the microphone 11 and represented in the frequency domain, is schematically indicated by a dotted line L0. The environmental noise indicated by the dotted line L0 is sampled with a quantization bit rate of 16 bits, and the results obtained by FFT analysis with the FFT circuit 13 are schematically indicated by a solid line L1. The environmental noise indicated by the dotted line L0 is sampled with a quantization bit rate of 24 bits, and the results obtained by FFT analysis with the FFT circuit 13 are schematically indicated by a solid line L2. The solid line L1 means the performance limit in the case of the quantization bit rate of 16 bits. In the case of noise lower in level than the solid line L1 (noise at the lower level in the graph), the analysis results substantially match the solid line L1 even if the noise is subjected to AD conversion with 16 bits. Meanwhile, the solid line L2 means the performance limit in the case of the quantization bit rate of 24 bits. In the case of noise lower in level than the solid line L2 (noise at the lower level in the graph), the analysis results substantially match the solid line L2 even if the noise is subjected to AD conversion with 24 bits.

Here, in a case where relatively small environmental noise having frequency characteristics like the dotted line L0 is sampled with a quantization bit rate of 16 bits and subjected to FFT analysis with the FFT circuit 13, the results substantially match the solid line L1. Meanwhile, in a case where relatively small environmental noise having frequency characteristics like the dotted line L0 is sampled with a quantization bit rate of 24 bits and subjected to FFT analysis with the FFT circuit 13, the results substantially match the dotted line L0.

Thus, in the case of small environmental noise, there is a difference between the results obtained by performing frequency analysis on the digital audio data obtained by AD conversion with the quantization bit rate of 16 bits and the results obtained by performing frequency analysis on the digital audio data obtained by AD conversion with the quantization bit rate of 24 bits. That is, since a decrease in the noise component is found between the results of the two frequency analyses, the determination unit 14a determines in this case that it is more appropriate to set the quantization bit rate to 24 bits for the environment.

On the other hand, consider a case of large environmental noise as shown in FIG. 2B (a case where the level of the dotted line L0 exceeds those of the solid lines L1 and L2). In this case, in a case where relatively large environmental noise having frequency characteristics like a dotted line L0 shown in FIG. 2B is sampled with a quantization bit rate of 16 bits and subjected to FFT analysis with the FFT circuit 13, the results substantially match the dotted line L0. Meanwhile, in a case where relatively large environmental noise having frequency characteristics like the dotted line L0 is sampled with a quantization bit rate of 24 bits and subjected to FFT analysis with the FFT circuit 13, the results substantially match the dotted line L0.

Thus, in the case of large environmental noise, there is no difference between the results obtained by performing frequency analysis on the digital audio data obtained by AD conversion with the quantization bit rate of 16 bits and the results obtained by performing frequency analysis on the digital audio data obtained by AD conversion with the quantization bit rate of 24 bits. That is, since a decrease in the noise component is not found between the results of the two frequency analyses, minute sound is buried in the noise in this case, and the recording data amount only becomes large even if the quantization bit rate is set to 24 bits. Therefore, the determination unit 14a determines that it is more appropriate to set the quantization bit rate to 16 bits for the environment.

As described above, the determination unit 14a samples the two pieces of digital audio data with different quantization bit rates and determines the sound recording environment depending on whether or not there is a difference between the respective results obtained by performing the frequency analysis. For example, the frequency analysis is performed on each of the digital audio data D1 and D2 in real time, and a difference between analysis results DF1 and DF2, which are the results, is obtained and integrated.

Then, the determination unit 14a determines that there is no difference between the analysis results DF1 and DF2, for example, if the difference between the analysis results DF1 and DF2 (e.g., the integrated value of the differences) is less than a predetermined threshold. The determination unit 14a determines that there is a difference between the analysis results DF1 and DF2 if the difference between the analysis results DF1 and DF2 is equal to or greater than the predetermined threshold. In a case where there is no difference, the DSP 14 outputs, to the recording unit 16, the recording control signal SG for recording the digital audio data D1 compatible with the quantization bit rate of 16 bits. The switcher is controlled by the recording control signal SG so that the input becomes the digital audio data D1. The recording unit 16 records the digital audio data D1 on the recording medium 17. On the other hand, in a case where there is a difference, the DSP 14 outputs, to the recording unit 16, the recording control signal SG for recording the digital audio data D2 compatible with the quantization bit rate of 24 bits. The switcher is controlled by the recording control signal SG so that the input becomes the digital audio data D2. The recording unit 16 records the digital audio data D2 on the recording medium 17.

Display Examples

Figure 3A:
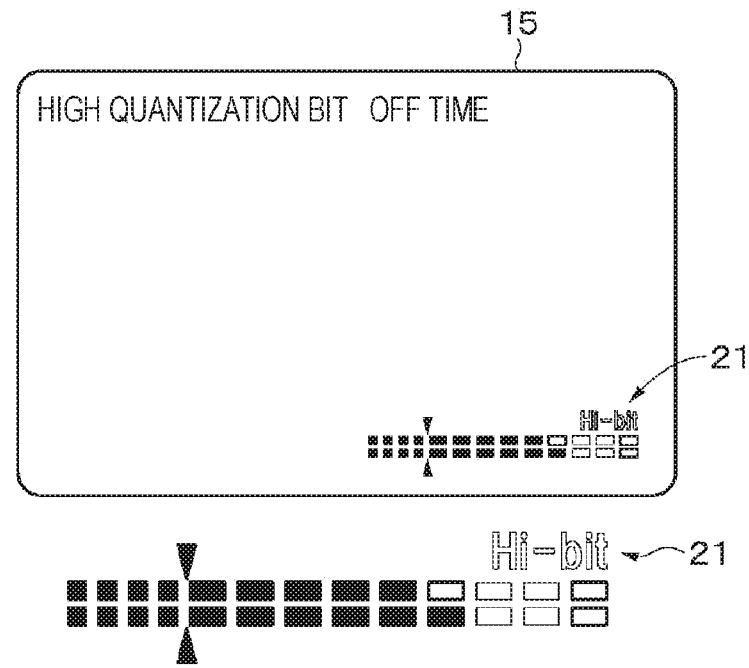
FIGS. 3A and 3B are diagrams showing examples of display regarding a quantization bit rate.
Figure 3B:
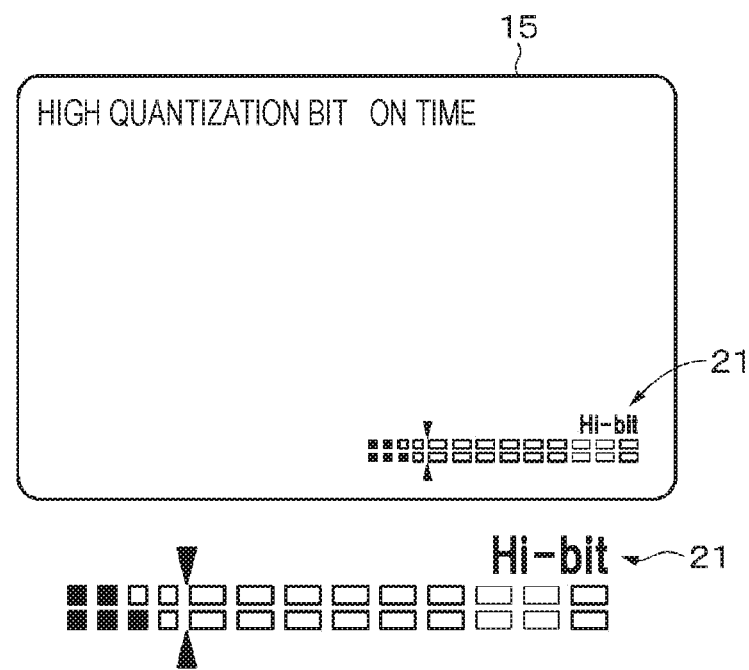

In the present embodiment, notification regarding the quantization bit rate according to the determination result by the determination unit 14a is made by display. These display examples will be described. Display examples shown in FIGS. 3A and 3B are display examples showing whether the quantization bit rate of the digital audio data to be recorded is 16 bits or 24 bits. For example, characters 21 of "Hi-bit" is displayed in the right corner of the display unit 15 (note that FIGS. 3A and 3B show the enlarged characters 21 and the like displayed on the display unit 15 under the drawings showing the display unit 15). In a case where the quantization bit rate of the digital audio data to be recorded is 16 bits, for example, the outlined characters 21 are displayed as shown in FIG. 3A. Moreover, in a case where the quantization bit rate of the digital audio data to be recorded is 24 bits, the colored characters 21 are displayed as shown in FIG. 3B. The color of the characters 21 can be blue or any other color. Furthermore, the characters 21 may be blinked, or the characters 21 may be displayed only in the case where the quantization bit rate of the digital audio data to be recorded is 24 bits.

Note that a plurality of rectangles and two triangles may be displayed below the display of the characters "Hi-bit" as shown in FIGS. 3A and 3B. For example, the plurality of rectangles is arranged in two rows, upper and lower, to be displayed. In the upper and lower rows of the rectangles, for example, the two frames of the upper and lower rectangles positioned on the rightmost side are displayed in red, the four frames of the upper and lower rectangles positioned second and third from the right side are displayed in yellow, and the frames of other rectangles are displayed in green. Moreover, the sizes of the rectangles on the left side (e.g., in the left four columns (eight rectangles)) are slightly made smaller than those of other rectangles. The two triangles are displayed in blue so as to point between predetermined rectangles. As a matter of course, these colors of the rectangles are merely examples and are not limited to the illustrated colors.

A frame of a rectangle represents a level of an audio signal. In accordance with the level of the audio signal, the inside of each rectangle is colored with the same color as the frame. The higher the level of the audio signal is, the more the right rectangle is colored. A rectangle with a red frame represents the upper limit of the level, a yellow rectangle represents a high level, and a green rectangle represents a safe level. The small size of the left rectangle indicates a region where the level of the audio signal level is low. The triangles correspond to the solid lines L1 shown in FIGS. 2A and 2B and roughly indicate that the characters "Hi-bit" are colored and displayed in a case where a signal is smaller than the triangle marks in a case where FFT of 16 bits is converted into a signal level. As described above, the level of the audio signal may be displayed in association with an index (rough indication) where the quantization bit rate of the audio signal to be recorded becomes 16 bits. Therefore, a user can intuitively recognize the quantization bit rate to be applied in accordance with the level of the input audio signal.

The display regarding the quantization bit rate may be a presentation of an appropriate quantization bit rate (recommended quantization bit rate) with respect to environmental noise in the recording environment. For example, the quantization bit rate can be set through a manipulation input unit such as a button or a touch screen provided in the sound processing apparatus 1. The user may refer to the displayed recommended quantization bit rate to manipulate the manipulation input unit such that the user can set the quantization bit rate (e.g., the recommended quantization bit rate displayed) in the sound processing apparatus 1.

Note that the display mode may be other than the characters "Hi-bit," may be a figure such as a bar instead of a character, or may be a combination of a character and a figure. Moreover, the notification is not limited to by the display, and may be notification by light such as lighting of a light emitting diode (LED), notification by sound, notification by vibration, notification by a combination thereof, or the like.

[Processing Flow]

Figure 4:
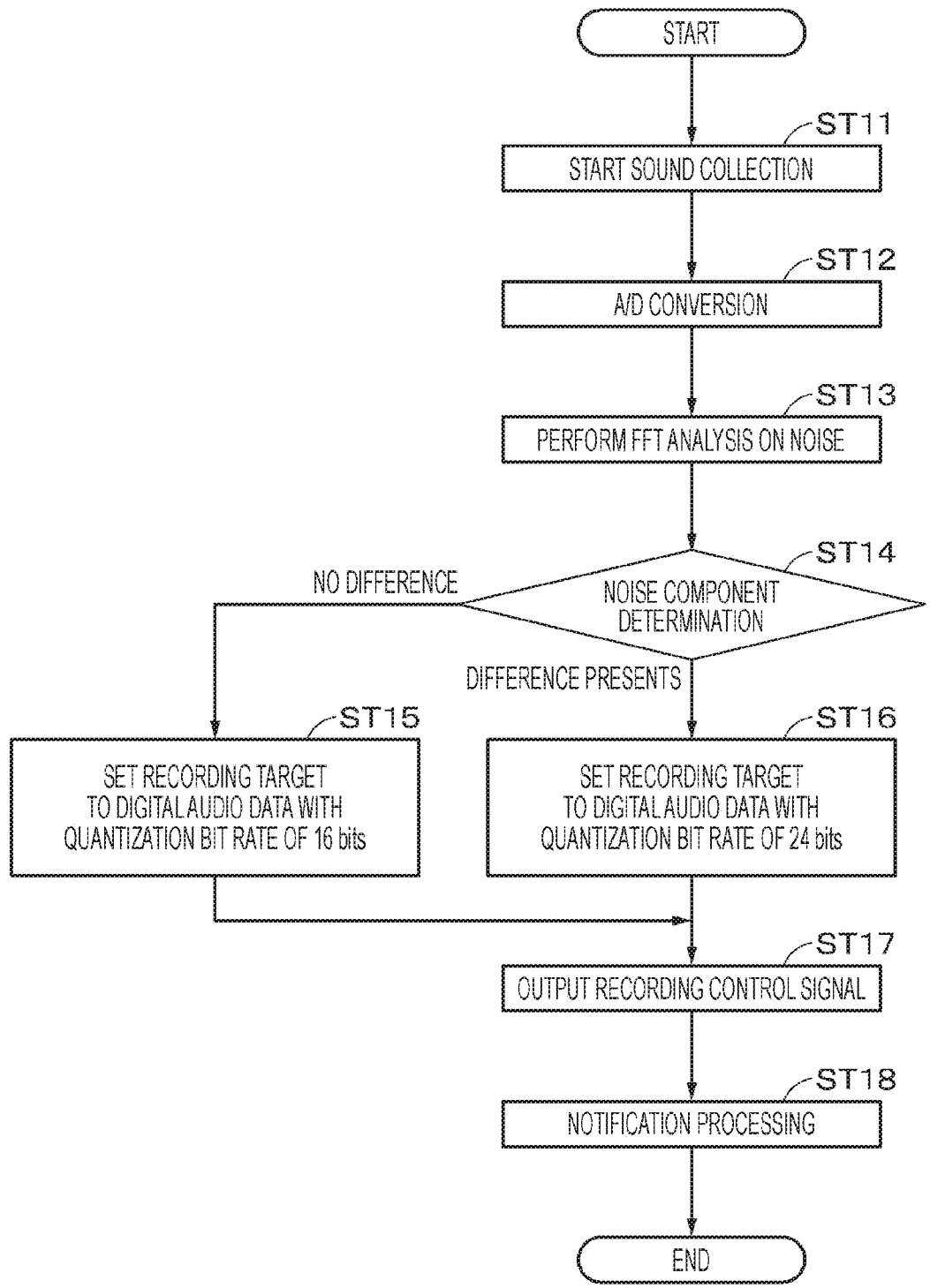
FIG. 4 is a flowchart showing a flow of processing in the sound processing apparatus according to the first embodiment.

With reference to a flowchart in FIG. 4, one example of the flow of the processing executed in the sound processing apparatus 1 will be described.

In Step ST11, the sound collection by the microphone 11 is started. The timing when the microphone 11 starts the sound collection can be set to appropriate timing. For example, the microphone 11 may start the sound collection at the timing before recording (e.g., timing when the sound processing apparatus 1 is activated). Furthermore, in a case where the sound processing apparatus 1 is applied to a sound-recording apparatus or an imaging apparatus, the microphone 11 may start the sound collection at the timing when sound-recording or image-recording is started. The microphone 11 outputs, to the A/D converter 12, the analog audio data corresponding to the collected sound. Then, the processing proceeds to Step ST12.

In Step ST12, the A/D converter 12 subjects the analog audio data to the AD conversion. The A/D converter 12 samples the analog audio data with a quantization bit rate of 16 bits to obtain the digital audio data D1. The A/D converter 12 also samples the analog audio data with a quantization bit rate of 24 bits to obtain the digital audio data D2. The two pieces of AD conversion processing are performed, for example, in parallel. Note that AD conversion with different quantization bit rates is performed on respective left/right (LR) audio data in a case where the microphone 11 outputs audio data in a stereo format (two channels). The A/D converter 12 outputs the digital audio data D1 and D2 to both the FFT circuit 13 and the recording unit 16. Then, the processing proceeds to Step ST13.

In Step ST13, the FFT analysis is performed. The FFT circuit 13 performs FFT on each of the digital audio data D1 and D2 and obtains the analysis results DF1 and DF2 which are the results. The FFT circuit 13 outputs the analysis results DF1 and DF2 to the DSP 14. Then, the processing proceeds to Step ST14.

In Step ST14, the determination unit 14a of the DSP 14 compares the analysis result DF1 with the analysis result DF2 and determines whether or not there is a difference between the analysis results DF1 and DF2 to make determination regarding the noise component. In a case where there is no difference between the analysis results DF1 and DF2, in other words, in a case where a decrease in the noise component is not found even when the quantization bit rate is 16 bits and even when the quantization bit rate is 24 bits, the processing proceeds to Step ST15. In Step ST15, the DSP 14 sets the recording target to the digital audio data (the digital audio data D1) with the quantization bit rate of 16 bits. Then, the processing proceeds to Step ST17.

On the other hand, in a case where there is a difference, which is equal to or greater than the threshold, between the analysis results DF1 and DF2, in other words, in a case where a decrease in the noise component is found due to the difference between the quantization bit rates, the processing proceeds to Step ST16. In Step ST16, the DSP 14 sets the recording target to the digital audio data (the digital audio data D2) with the quantization bit rate of 24 bits. Then, the processing proceeds to Step ST17.

In Step ST17, the DSP 14 outputs, to the recording unit 16, the recording control signal SG according to the determination result of the determination unit 14a. The recording control signal SG switches the input, and the recording unit 16 records either the digital audio data D1 or D2 on the recording medium 17. Then, the processing proceeds to Step ST18.

In Step ST18, the notification regarding the quantization bit rate is made. For example, as described with reference to FIGS. 3A and 3B, the information regarding the quantization bit rate of the recorded digital audio data is displayed. The pieces of processing described above are repeated for a predetermined period (e.g., a period during which sound-recording or image-recording is performed).

[Effects]

According to the first embodiment described above, for example, it is possible to obtain the following effects.

With a device capable of increasing a quantization bit rate, a mode for increasing a quantization bit rate can be automatically selected or selected by the user only when effective effects can be obtained. Therefore, even in a case where effective effects cannot be obtained, wasteful consumption of memory capacity due to setting the high quantization bit rate can be avoided. Furthermore, in a case where a quantization bit rate is lowered, writing to a recording medium with a low writing speed may be possible due to a decrease in a recording rate.

2. Second Embodiment

Next, a second embodiment will be described. Note that the matters described in the first embodiment can also be applied to the second embodiment unless otherwise specified. Similar or the same constituents are denoted by the same reference signs to omit the redundant descriptions thereof. The second embodiment is an embodiment in which a determination unit 14a of a DSP 14 determines the performance of a microphone. The performance of the microphone includes noise performance called a self-noise level.

Figure 5:
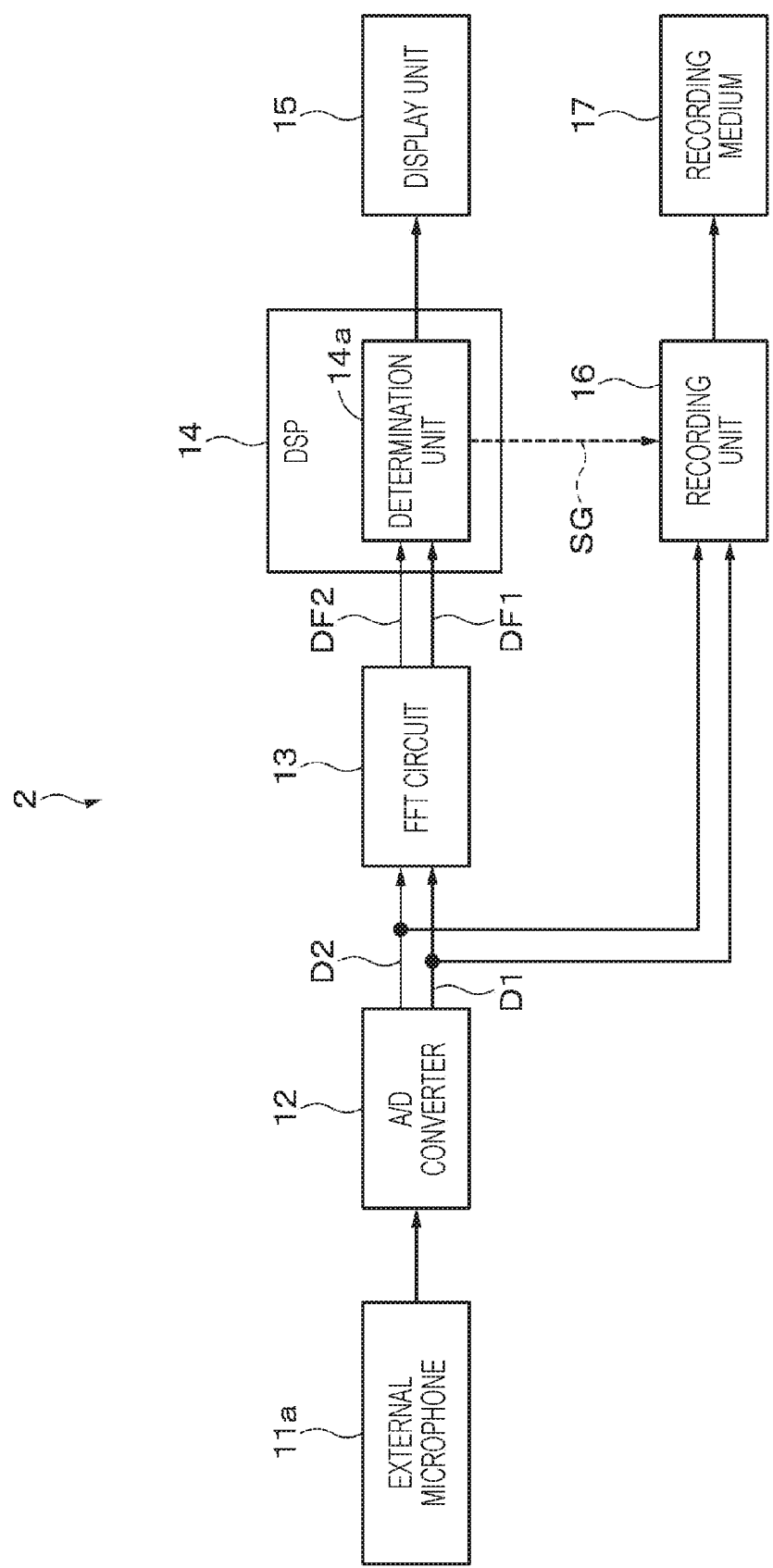
FIG. 5 is a block diagram showing a configuration example of a sound processing apparatus according to a second embodiment.

FIG. 5 is a diagram showing a configuration example of a sound processing apparatus (sound processing apparatus 2) according to the second embodiment. The sound processing apparatus 2 is different from the sound processing apparatus 1 in that the microphone 11 is an external microphone 11a detachable from the sound processing apparatus 2. The presumed external microphone 11a has unknown performance, or presents certain noise performance but is unknown whether the external microphone 11a actually has that performance.

The basic operation of the sound processing apparatus 2 is similar to that of the sound processing apparatus 1. Briefly described, analog audio data obtained by collecting sound with the external microphone 11a is supplied to an A/D converter 12. The A/D converter 12 performs AD conversion on the analog audio data with quantization bit rates of 16 bits and 24 bits to obtain digital audio data D1 and D2. FFT is performed on the digital audio data D1 and D2 by an FFT circuit 13, and analysis results DF1 and DF2, which are the results, are supplied to the determination unit 14a.

Here, the dotted line L0 shown in FIGS. 2A and 2B can be replaced with a noise component based on the noise performance of the external microphone 11a in the second embodiment. For example, in a case where the external microphone 11a is excellent in noise performance, the level of the noise component is small (e.g., the dotted line L0 in FIG. 2A). In this case, as described in the first embodiment, there is a difference between the analysis results DF1 and DF2. On the other hand, in a case where the external microphone 11a is not excellent in noise performance, noise superposed on the collected sound is large, and the noise component is large (e.g., the dotted line L0 in FIG. 2B). There is no difference between the analysis results DF1 and DF2 (the difference includes a value less than a threshold).

That is, in a case where there is a difference between the analysis results DF1 and DF2, the determination unit 14a determines that the external microphone 11a is excellent in noise performance, and outputs, to a recording unit 16, a recording control signal SG for recording the digital audio data D1 with the quantization bit rate of 24 bits. On the other hand, in a case where there is no difference between the analysis results DF1 and DF2, the determination unit 14a determines that the external microphone 11a is not excellent in noise performance, and outputs, to the recording unit 16, a recording control signal SG for recording the digital audio data D2 with the quantization bit rate of 16 bits. The input is switched by the recording control signal SG. The recording unit 16 records either the digital audio data D1 or D2 on a recording medium 17.

Note that notification according to the second embodiment may be made. For example, a notification that the performance of the external microphone 11a is equal to or greater than a certain level or that the performance of the external microphone 11a is inferior to a certain level may be made by display or the like.

According to the second embodiment described above, it is possible to determine the performance of the microphone connected to the sound processing apparatus and record digital audio data based on an appropriate quantization bit rate in response to the determination result. Furthermore, effects similar to those of the first embodiment can be obtained.

3. Third Embodiment

Next, a third embodiment will be described. Note that the matters described in the first and second embodiments can also be applied to the third embodiment unless otherwise specified. Similar or the same constituents are denoted by the same reference signs to omit the redundant descriptions thereof. The third embodiment is generally an embodiment in which the first embodiment and the second embodiment are combined.

Figure 6:
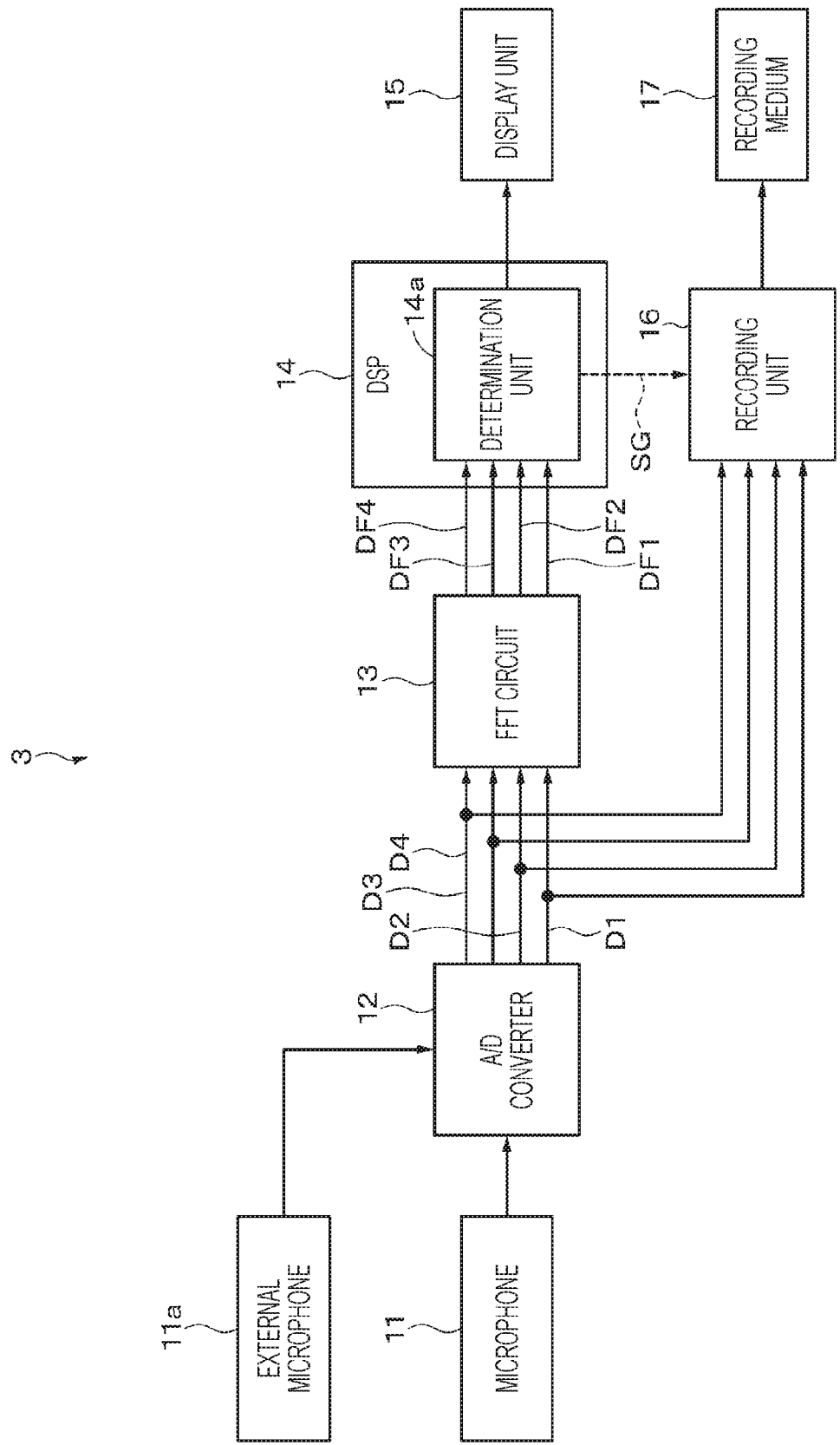
FIG. 6 is a block diagram showing a configuration example of a sound processing apparatus according to a third embodiment.

FIG. 6 is a block diagram showing a configuration example of a sound processing apparatus (sound processing apparatus 3) according to the third embodiment. The sound processing apparatus 3 has a microphone 11 and an external microphone 11a. Other constituents are the same as those of the sound processing apparatuses 1 and 2.

The microphone 11 is a microphone included in the sound processing apparatus 3 and is a microphone having sufficient performance for a quantization bit rate of 24 bits as described above. The presumed external microphone 11a has unknown performance, or presents certain noise performance but is unknown whether the external microphone 11a actually has that performance. Note that the input from the microphone 11 and the input from the external microphone 11a can be switched by, for example, user manipulation.

An operation example of the sound processing apparatus 3 will be described. Analog audio data obtained by collecting sound with the microphone 11 is supplied to an A/D converter 12. The A/D converter 12 performs AD conversion to sample the analog audio data with the respective quantization bit rates of 16 bits and 24 bits and obtains digital audio data D1 and D2. Furthermore, analog audio data obtained by collecting sound with the external microphone 11a is supplied to the A/D converter 12. The A/D converter 12 performs AD conversion to sample the analog audio data with the respective quantization bit rates of 16 bits and 24 bits and obtains digital audio data D3 and D4.

The digital audio data D1 to D4 are input into a recording unit 16 in the third embodiment. One input of the four inputs is selected by a switcher (not shown), and the digital audio data of the selected input is recorded on a recording medium 17 by the recording unit 16.

The digital audio data D1 to D4 are supplied to an FFT circuit 13. The FFT circuit 13 performs FFT on each piece of the digital audio data D1 to D4 and obtains analysis results DF1 to DF4 which are the results. The analysis results DF1 to DF4 are supplied to a DSP 14.

A determination unit 14a of the DSP 14 determines the volume of the environmental noise on the basis of the analysis results DF1 and DF2 as in the first embodiment. The determination unit 14a also determines the performance of the external microphone 11a on the basis of the analysis results DF3 and DF4 as in the second embodiment. Note that the pieces of processing of determining the environmental noise and the performance of the microphone may be performed in time series or in parallel.

For example, the determination results by the determination unit 14a can be classified into the following four patterns.

Pattern A: the environmental noise is small and the performance of the external microphone 11a is equal to or greater than a certain level.

Pattern B: the environmental noise is small, but the performance of the external microphone 11a is less than the certain level.

Pattern C: the environmental noise is large and the performance of the external microphone 11a is equal to or greater than the certain level.

Pattern D: the environmental noise is large and the performance of the external microphone 11a is less than the certain level.

In a case where the determination result of the determination unit 14a is the pattern A, the environment and the performance of the microphone can provide advantageous effects by increasing a quantization bit rate. Therefore, the DSP 14 sets the recording target to the digital audio data D2 or the digital audio data D4 with the quantization bit rate of 24 bits. Setting the recording target to either the digital audio data D2 or D4 is decided, for example, in accordance with the input setting by a user. The DSP 14 outputs a recording control signal SG to the recording unit 16. The switcher is switched by the recording control signal SG, and either the digital audio data D2 or D4 is recorded on the recording medium 17.

In a case where the determination result of the determination unit 14a is the pattern B, the DSP 14 sets the digital audio data to be recorded on the recording medium 17 in accordance with the settings regarding a microphone to be used. For example, in a case where the microphone 11 is set as the microphone to be used, either the digital audio data D1 or D2 becomes the recording target. Since the environmental noise is small in the case of the pattern B, the DSP 14 sets the digital audio data D2 as the recording target and outputs, to the recording unit 16, a recording control signal SG compatible with the setting. The switcher is switched in response to the recording control signal SG, and the digital audio data D2 is recorded on the recording medium 17 by the recording unit 16. On the other hand, in a case where the external microphone 11a is set as the microphone to be used, either the digital audio data D3 or D4 becomes the recording target. In the case of the pattern B, since the performance of the external microphone 11a is less than a certain level, the DSP 14 sets the digital audio data D3 as the recording target and outputs, to the recording unit 16, a recording control signal SG compatible with the setting. The switcher is switched in response to the recording control signal SG, and the digital audio data D3 is recorded on the recording medium 17 by the recording unit 16.

In a case where the determination result of the determination unit 14a is the pattern C, there are few advantages to record digital audio data with a quantization bit rate of 24 bits because there is a lot of environmental noise. Accordingly, either the digital audio data D1 or D3 becomes the recording target. In a case where the microphone 11 is set as the microphone to be used, the DSP 14 sets the digital audio data D1 as the recording target and outputs, to the recording unit 16, a recording control signal SG compatible with the setting. The switcher is switched in response to the recording control signal SG, and the digital audio data D1 is recorded on the recording medium 17 by the recording unit 16. On the other hand, in a case where the external microphone 11a is set as the microphone to be used, the DSP 14 sets the digital audio data D3 as the recording target and outputs, to the recording unit 16, a recording control signal SG compatible with the setting. The switcher is switched in response to the recording control signal SG, and the digital audio data D3 is recorded on the recording medium 17 by the recording unit 16.

Also in a case where the determination result of the determination unit 14a is the pattern D, the pieces of processing are similar to those of the pattern C because there is a lot of environmental noise. Briefly described, in a case where the microphone 11 is set as the microphone to be used, the digital audio data D1 is recorded on the recording medium 17. In a case where the external microphone 11a is set as the microphone to be used, the digital audio data D3 is recorded on the recording medium 17. Note that notification regarding the quantization bit rate and notification regarding the performance of the microphone may also be made in the third embodiment.

According to the third embodiment as described above, digital audio data with an appropriate quantization bit rate can be recorded on a recording medium depending on the environmental noise and the performance of the external microphone. Furthermore, effects similar to those described in the first and second embodiments can be obtained.

4. Modification Examples

Although the embodiments of the present disclosure have been specifically described above, the contents of the present disclosure are not limited to the above-described embodiments, and various modifications based on the technical idea of the present disclosure can be made.

The configuration of the sound processing apparatus according to each of the embodiments described above can be changed as appropriate. For example, the sound processing apparatus may not have a display unit as a constituent thereof. The display unit can be connected to the sound processing apparatus with or without wire. Moreover, the sound processing apparatus may not have a recording unit and a recording medium as constituents thereof. For example, digital audio data corresponding to the determination result by the determination unit may be transmitted to a different apparatus (e.g., a cloud server or a personal computer) existing on a network via a communication unit. Then, the recording processing may be performed by a recording unit included in the different apparatus. Furthermore, in the above-described embodiments, the microphone and the A/D converter may be connected with or without wire.

The sound processing apparatus according to each of the above-described embodiments may have the number of A/D converters compatible with the patterns of a quantization bit rate (e.g., two patterns of 16 bits and 24 bits). Then, the DSP may perform control to operate only the A/D converter for the determination result of the determination unit. Therefore, the amount of data sent in the sound processing apparatus can be reduced.

The recording unit according to each of the above-described embodiments may record, on a recording medium, all of a plurality of pieces of digital audio data to be input. Then, for example, after the user actually listens to the sound obtained by demodulating the digital audio data, the sound data may be deleted or stored as appropriate.

The functions described in each of the above-described embodiments can be realized in any form, such as a method, a program, or a recording medium on which the program is recorded. Moreover, the program may be downloadable. Then, a different apparatus (e.g., an imaging apparatus or a smartphone) may download and install the program to realize the functions described in each of the embodiments.

The configurations, methods, steps, shapes, materials, numerical values, and the like listed in the above-described embodiments are merely examples, and different configurations, methods, steps, shapes, materials, numerical values, and the like may be used as necessary. The above-described embodiments and modification examples can be combined as appropriate.

The present disclosure can also adopt the following configurations.

(1)

A sound processing apparatus including:

a conversion unit configured to sample predetermined audio data with a first quantization bit rate and a second quantization bit rate greater than the first quantization bit rate and output respective results as first digital audio data and second digital audio data;

a frequency analysis unit configured to perform frequency analysis on each output from the conversion unit; and a determination unit configured to perform predetermined determination processing on the basis of analysis results by the frequency analysis unit.

(2)

The sound processing apparatus according to (1), further including a recording unit configured to selectively record the first digital audio data and the second digital audio data on a recording medium on the basis of a determination result by the determination unit.

(3)

The sound processing apparatus according to (2), in which the recording unit is configured to record the first digital audio data on the recording medium in a case where there is no difference equal to or greater than a threshold between a result obtained by performing the frequency analysis on the first digital audio data and a result obtained by performing the frequency analysis on the second digital audio data, and the recording unit is configured to record the second digital audio data on the recording medium in a case where there is a difference equal to or greater than the threshold between the result obtained by performing the frequency analysis on the first digital audio data and the result obtained by performing the frequency analysis on the second digital audio data.

(4)

The sound processing apparatus according to any one of (1) to (3), further including a notification unit configured to make notification regarding the first quantization bit rate and the second quantization bit rate according to the determination result by the determination unit.

(5)

The sound processing apparatus according to (4), further including a display unit configured to make the notification by display.

(6)

The sound processing apparatus according to (5), in which whether a quantization bit rate of digital audio data to be recorded is the first quantization bit rate or the second quantization bit rate is displayed on the display unit.

(7)

The sound processing apparatus according to (6), in which level distribution of audio data and an index to which the first quantization bit rate is applied are associated to be displayed on the display unit.

(8)

The sound processing apparatus according to (1) to (7), in which the determination unit determines environmental noise on the basis of the analysis results by the frequency analysis unit.

(9)

The sound processing apparatus according to any one of (1) to (8), in which the determination unit determines performance of a sound collection unit on the basis of the analysis results by the frequency analysis unit.

(10)

The sound processing apparatus according to any one of (1) to (9), further including the sound collection unit configured to collect sound corresponding to the predetermined audio data.

(11)

The sound processing apparatus according to (10), in which the sound collection unit includes at least one of a built-in microphone or an externally connected microphone.

(12)

The sound processing apparatus according to any one of (1) to (11), in which the first quantization bit rate is a bit number less than 16 bits, and the second quantization bit rate is a bit number greater than 24 bits.

(13)

The sound processing apparatus according to (12), in which the first quantization bit rate is 16 bits, and the second quantization bit rate is 24 bits or 32 bits.

(14)

A sound processing method including:

by a conversion unit, sampling predetermined audio data with a first quantization bit rate and a second quantization bit rate greater than the first quantization bit rate and outputting respective results as first digital audio data and second digital audio data;

by a frequency analysis unit, performing frequency analysis on each output from the conversion unit; and by a determination unit, performing predetermined determination processing on the basis of analysis results by the frequency analysis unit.

(15)

A program causing a computer to execute a sound processing method, the sound processing method including:

by a conversion unit, sampling predetermined audio data with a first quantization bit rate and a second quantization bit rate greater than the first quantization bit rate and outputting respective results as first digital audio data and second digital audio data;

by a frequency analysis unit, performing frequency analysis on each output from the conversion unit; and by a determination unit, performing predetermined determination processing on the basis of analysis results by the frequency analysis unit.

REFERENCE SIGNS LIST 1, 2, 3 Sound processing apparatus
11 Microphone
11a External microphone
12 A/D converter
13 FFT circuit
14 DSP
14a Determination unit
15 Display unit
16 Recording unit
17 Recording medium

The invention claimed is:

1. A sound processing apparatus, comprising:
   circuitry configured to:
   concurrently sample specific audio data with a first quantization bit rate and a second quantization bit rate, wherein the second quantization bit rate is greater than the first quantization bit rate;
   output first digital audio data and second digital audio data, wherein
      the first digital audio data is based on the specific audio data sampled with the first quantization bit rate, and
      the second digital audio data is based on the specific audio data sampled with the second quantization bit rate;
   execute frequency analysis on each of the first digital audio data and the second digital audio data;
   obtain a first analysis result based on the frequency analysis on the first digital audio data;
   obtain a second analysis result based on the frequency analysis on the second digital audio data;
   execute a specific determination process to determine a difference between the first analysis result and the second analysis result;
   record the first digital audio data on a recording medium based on the difference that is less than a threshold; and
   record the second digital audio data on the recording medium based on the difference that is one of equal to or greater than the threshold.

2. The sound processing apparatus according to claim 1, wherein the circuitry is further configured to generate a notification regarding the first quantization bit rate and the second quantization bit rate based on a determination result of the specific determination process.

3. The sound processing apparatus according to claim 2, further comprising a display screen configured to display the notification.

4. The sound processing apparatus according to claim 3, wherein
   the display screen is further configured to display one of the first quantization bit rate of the first digital audio data recorded in the recording medium, or the second quantization bit rate of the second digital audio data recorded in the recording medium.

5. The sound processing apparatus according to claim 4, wherein the display screen is further configured to display level distribution of the specific audio data in association with an index to which the first quantization bit rate is applied.

6. The sound processing apparatus according to claim 1, wherein the circuitry is further configured to determine environmental noise based on the first analysis result and the second analysis result of the frequency analysis.

7. The sound processing apparatus according to claim 1, wherein the circuitry is further configured to determine performance of a sound collection unit based on the first analysis result and the second analysis result of the frequency analysis.

8. The sound processing apparatus according to claim 1, further comprising a microphone configured to collect sound corresponding to the specific audio data.

9. The sound processing apparatus according to claim 8, wherein the microphone is one of a built-in microphone or an externally connected microphone.

10. The sound processing apparatus according to claim 1, wherein the first quantization bit rate is a bit number less than 16 bits, and the second quantization bit rate is a bit number greater than 24 bits.

11. The sound processing apparatus according to claim 1, wherein the first quantization bit rate is 16 bits, and the second quantization bit rate is one of 24 bits or 32 bits.

12. A sound processing method, comprising:
   concurrently sampling, by circuitry, specific audio data with a first quantization bit rate and a second quantization bit rate, wherein the second quantization bit rate is greater than the first quantization bit rate;
   outputting, by the circuitry, first digital audio data and second digital audio data, wherein
      the first digital audio data is based on the specific audio data sampled with the first quantization bit rate, and
      the second digital audio data is based on the specific audio data sampled with the second quantization bit rate;
   executing, by the circuitry, frequency analysis on each of the first digital audio data and the second digital audio data;
   obtaining, by the circuitry, a first analysis result based on the frequency analysis on the first digital audio data;
   obtaining, by the circuitry, a second analysis result based on the frequency analysis on the second digital audio data;
   executing, by the circuitry, a specific determination process to determine a difference between the first analysis result and the second analysis result;
   recording, by the circuitry, the first digital audio data on a recording medium based on the difference that is less than a threshold; and
   recording, by the circuitry, the second digital audio data on the recording medium based on the difference that is one of equal to or greater than the threshold.

13. A non-transitory computer-readable medium having stored thereon, computer-executable instructions which, when executed by a computer, cause the computer to execute operations, the operations comprising:
   concurrently sampling specific audio data with a first quantization bit rate and a second quantization bit rate, wherein the second quantization bit rate is greater than the first quantization bit rate;
   outputting first digital audio data and second digital audio data, wherein
      the first digital audio data is based on the specific audio data sampled with the first quantization bit rate, and
      the second digital audio data is based on the specific audio data sampled with the second quantization bit rate;
   executing frequency analysis on each of the first digital audio data and the second digital audio data;
   obtaining a first analysis result based on the frequency analysis on the first digital audio data;

obtaining a second analysis result based on the frequency analysis on the second digital audio data;

executing a specific determination process to determine a difference between the first analysis result and the second analysis result;

recording the first digital audio data on a recording medium based on the difference that is less than a threshold; and recording the second digital audio data on the recording medium based on the difference that is one of equal to or greater than the threshold.

\* \* \* \* \*